United States Patent [19]

Mollier

[11] Patent Number: 4,467,139
[45] Date of Patent: Aug. 21, 1984

[54] PROCESS AND SYSTEM FOR TRANSMISSION OF SIGNED MESSAGES

[75] Inventor: Jean H. Mollier, Bougival, France

[73] Assignee: Compagnie Internationale pour l'Informatique Cii Honeywell Bull, Paris, France

[21] Appl. No.: 242,850

[22] Filed: Mar. 12, 1981

[30] Foreign Application Priority Data

Apr. 9, 1980 [FR] France ................................ 80 07912

[51] Int. Cl.³ ............................................. H04L 9/00
[52] U.S. Cl. .............................. 178/22.08; 178/22.13; 178/22.16
[58] Field of Search ............... 178/22.05, 22.08, 22.13, 178/22.16

[56] References Cited

U.S. PATENT DOCUMENTS

| | | | |
|---|---|---|---|
| 4,123,747 | 10/1978 | Lancto et al. | 178/22.08 |
| 4,193,131 | 3/1980 | Lennon et al. | 178/22.08 |
| 4,206,315 | 6/1980 | Matayas et al. | 178/22.08 |
| 4,264,782 | 4/1981 | Konheim | 178/22.08 |
| 4,281,215 | 7/1981 | Atalla | 178/22.08 |
| 4,309,569 | 1/1982 | Merkle | 178/22.08 |
| 4,326,098 | 4/1982 | Bouricius et al. | 178/22.08 |
| 4,349,695 | 9/1982 | Morgan et al. | 178/22.08 |
| 4,386,233 | 5/1983 | Smid et al. | 178/22.08 |

OTHER PUBLICATIONS

Martin Hellman, "Cryptographic Protect of Information in Communications Networks", Conf. Record of 11th Seminar on Circuits, Systems and Computers, (11/7–9/77), pp. 204–207, published by IEEE.
R. Herve, "A Portable Component for Access Control and Network Protection", Cii Honeywell Bull, (10/80).
One Way Sequence for Transaction Verification, (8/24–26/81), Konheim (II) Crypto 81 Workshop at UC Santa Barbara.

*Primary Examiner*—Sal Cangialosi
*Attorney, Agent, or Firm*—Kerkam, Stowell, Kondracki & Clarke

[57] ABSTRACT

The transmission of signed messages occurs between a transmitter (1) and a receiver (3) connected by a transmission line system (2). The transmitter (1) and the receiver (3) respectively comprise a coding device 7 and a decoding device 11. Means 4 situated at the transmitter supply a signature SG as a function of the message M which is to be transmitted. The message associated with its signature, as well as a common key E, are transmitted by the transmitter towards the receiver after coding by means of an intrinsic key $R_1$. Upon being received, the message M linked with its signature SG is decoded by means of an intrinsic key $R_2$ determined at the receiver location in such manner as to establish equality between intrinsic keys $R_1$ and $R_2$.

49 Claims, 4 Drawing Figures

PROCESS AND SYSTEM FOR TRANSMISSION OF SIGNED MESSAGES

BACKGROUND OF THE INVENTION

The present invention relates to a process and system for transmission of "signed" messages. The present invention is related to the invention to which commonly-assigned copending application Ser. No. 200,785, filed Oct. 27, 1980, by Robert J. L. HERVE, and entitled "SYSTEM AND PROCESS FOR IDENTIFICATION OF PERSONS REQUESTING ACCESS TO PARTICULAR FACILITIES" is directed, the entire disclosure of which is hereby expressly incorporated by reference.

More particularly, the invention relates to systems in which messages are transmitted in a coded binary form, as well as in other forms. These messages are coded by means of coding keys upon transmission, and then decoded for restoration to their original clear form upon reception. A system of this kind is disclosed in commonly-assigned U.S. patent application Ser. No. 235,505, filed Feb. 18, 1981 by Robert J. L. HERVE, and entitled "METHOD AND SYSTEM FOR TRANSMISSION OF CONFIDENTIAL DATA", the entire disclosure of which is also hereby expressly incorporated by reference.

The system described in the above-identified application Ser. No. 235,505 makes use of two coding keys, as follows:

The first is a standard or common key E transmitted directly in clear from the transmitter to the receiver. The second is an intrinsic key R calculated simultaneously at the transmitter and the receiver locations. The intrinsic key R is a function of the common key E, of an identification code $I_n$ linked with the message which is transmitted, and of a secret code S stored in two devices situated at the transmitter and receiver respectively, or at the transmitter and receiver locations. The intrinsic key $R_1$ calculated at the transmitter location is used for encoding the message transmitted, and the intrinsic key $R_2$ calculated at the receiver location is used to decode the coded message transmitted.

If the calculating function employed at the transmitter and receiver locations is the same and if the secret code S stored at these locations is the same, the intrinsic keys R calculated are identical. Under these conditions, all that is needed is to utilize, at the transmitter and receiver locations, an operator which allows of simultaneous encoding of the message by means of the intrinsic key $R_1$ calculated upon transmission and decoding by means of the intrinsic key $R_2$ calculated upon reception. These coding and decoding operations may easily be performed by means of logic circuits of the combinatory type, for example EXCLUSIVE-OR circuits.

The system described makes it possible to perform constant modification of the intrinsic keys R calculated at the transmitter and receiver locations by random alteration in the course of time of the value of the common key E.

According to another feature of the system, the calculation of each of the intrinsic keys R at the transmitter and receiver locations is accomplished in each case by a processor situated within a portable object which also comprises a memory wherein is stored a program P for calculation of the function for determining the intrinsic key as a function of the secret code S also stored in the memory, of the common key E, and of the identification code $I_n$ linked with the message. These portable objects are each placed at the disposal of the persons entrusted with transmitting and receiving the messages.

The system may then operate only if both persons have strictly matched portable objects, which amounts to saying, for example, that the processing units must be actuated by the same program P and that the memories must contain the same secret code S. It is obvious that a fraudulent person lacking both the program P and the secret code S will be unable to calculate the intrinsic key R enabling him to decode the message transmitted. His task becomes ever more difficult since the system alters the common key E in a random manner.

According to another feature of the system, and for the purpose of increasing the security of the system in a practically absolute manner, each portable object of the system contains within its memory a table of the identification codes $I_n$ related to the messages which each person will be authorized to transmit and receive.

The identification code related to the message contained in the memories of the portable objects are located or "pointed" to by address generators at the transmitter and receiver locations. These address generators establish correspondence between the identification code $I_n$ linked with the message and the address of the identification code $I_n$ contained in the memory of the portable object. The message transmission may then only occur correctly if the address generator and the portable objects have been able to establish the identity of the identification code $I_n$ related to the message.

The system described in the above-identified patent application Ser. No. 235,505 resolves the problems of transmission of coded messages, but it is incomplete in that it does not render it possible to establish certain authentication of the person who had transmitted the messages, and this may constitute a handicap to the application of this system in particular spheres.

As a matter of fact, in the social structure—be it commercial or private—the agreements concluded between legal or physical entities may form the object of contracts. One of the contracting parties may, if it so wishes, enforce application in indisputable manner of the test specifying the contractual engagement. The contract is in effect liable to be implemented. The contract comprises a text and a particular number of signatures. The material form of the document (i.e., the written document) only resolves a practical problem of being made available for recognition. The legal ambit of the contract resides entirely in the data corresponding to the text and in the validity of the signatures appended. The transposition of a text in binary code, without loss of information, does not raise any difficulties. By contrast, if this transposition is not absolute for the signature, there is a loss of information, and more serious, the absence of a link between the text and the signature offers the possibility of combining a text and signature of different origins.

SUMMARY OF THE INVENTION

To eliminate these shortcomings, an object of the present invention is to provide a system for transmission of signed messages, which system couples the text of the message to its signature in indissoluble manner.

In accordance with one aspect of the invention, the system operates in a manner such that the sender of the message may easily produce the signature accompanying the same and such that this signature may be verified by the addresses.

In accordance with another aspect of the invention, the signature produced is strictly a function of the message transmitted; it is not accessible to third parties, and certainly not to the addressee who could make use of the same as of right to sign undertakings by mistakenly assuming the consent of the genuine holder of the signature.

In preferred embodiments, the system of the invention consequently has the following features:

(1) The production of the signature is automatic.
(2) The addressee is able to verify the signature on two levels:
  (a) On the level of the system as such, since the system as described in the above-identified patent application Ser. No. 235,505 establishes a dialogue between two matched portable objects which results in mutual recognition of the two correspondents; and
  (b) On the level of an agency which personalizes the portable objects by inserting a secret code or parameter J into the portable objects at the time of their delivery to their holders. If this agency alone is authorized to be cognizant of the totality of the secret code J of the portable objects which is issues to the applicants and for which it is consequently the repository, this agency may be consulted by any addressee who wishes to verify the signed message he had received.

This agency with which are deposited all the parameters J of the cards produced can discover the secret code J of any sender who has had to declare his identity to the addressee. If this identity is accurate, the storing agency is then able to determine the numerical value of the signature by means of the message entrusted to it and of the secret device allocated to the sender. In case of identity, the signature may be certified.

(3) The signature of the message is a function of the message. A single letter altered in the message removes from the whole, text and signature, its subjacent coherence. This may be done in the same way as an optional alteration to a message at the time of its transmission should be detected by the verification test determined at the time of transmission, transmitted after the message and checked upon reception (by means of the application of Hamming codes for example), in order to determine compatibility between the message and the test.

(For reasons of practical application, the message will most often be split into several blocks, each block being signed.)

(4) Access to the signature is denied to third parties in guaranteed manner.

(5) Although the addressee owns a portable object matched to that of the sender transmitting a message to him, he should not be able to validly sign the message he receives instead of the sender. This condition is fulfilled a priori without any trouble if the addressee does not know the secret code J, belonging to the sender, which would enable him to calculate the correct signature, and if he also lacks the sender's card which is the only means of producing this signature. The sender and addressee have in common only the secret code S and program P permitting the transposition of the common key E into an intrinsic key R for the coding and decoding operations.

The process and system for transmission of signed messages in accordance with the invention achieves the foregoing features.

Briefly, a process in accordance with the invention comprises the following steps:

(1) Producing a signature SG at the location of the message transmitter as a function of the message M which is to be transmitted, of a secret code J and of an identification code $I_n$ of the message, and then associating the message M with the signature SG thus obtained;

(2) Causing the transmitter to send a common key E and the identification code $I_n$ to the addressee; and (3) Causing to be calculated at the transmitter an intrinsic key $R_1$ for coding the message M which is to be transmitted associated with its signature SG at the transmitter location, and causing to be calculated at the receiver location an intrinsic key $R_2$ for decoding the message associated with its signature, each of the intrinsic keys $R_1$ and $R_2$ being obtained from a secret code S, from the identification code $I_n$ of the message and from the common key E supplied by the transmitter to the receiver.

The system in accordance with the invention employs the process summarized immediately above.

BRIEF DESCRIPTION OF THE DRAWINGS

The invention will now be further described by way of example, with reference to the accompanying drawings, in which.

DETAILED DESCRIPTION OF THE PREFERRED EMBODIMENT

Figure 1:
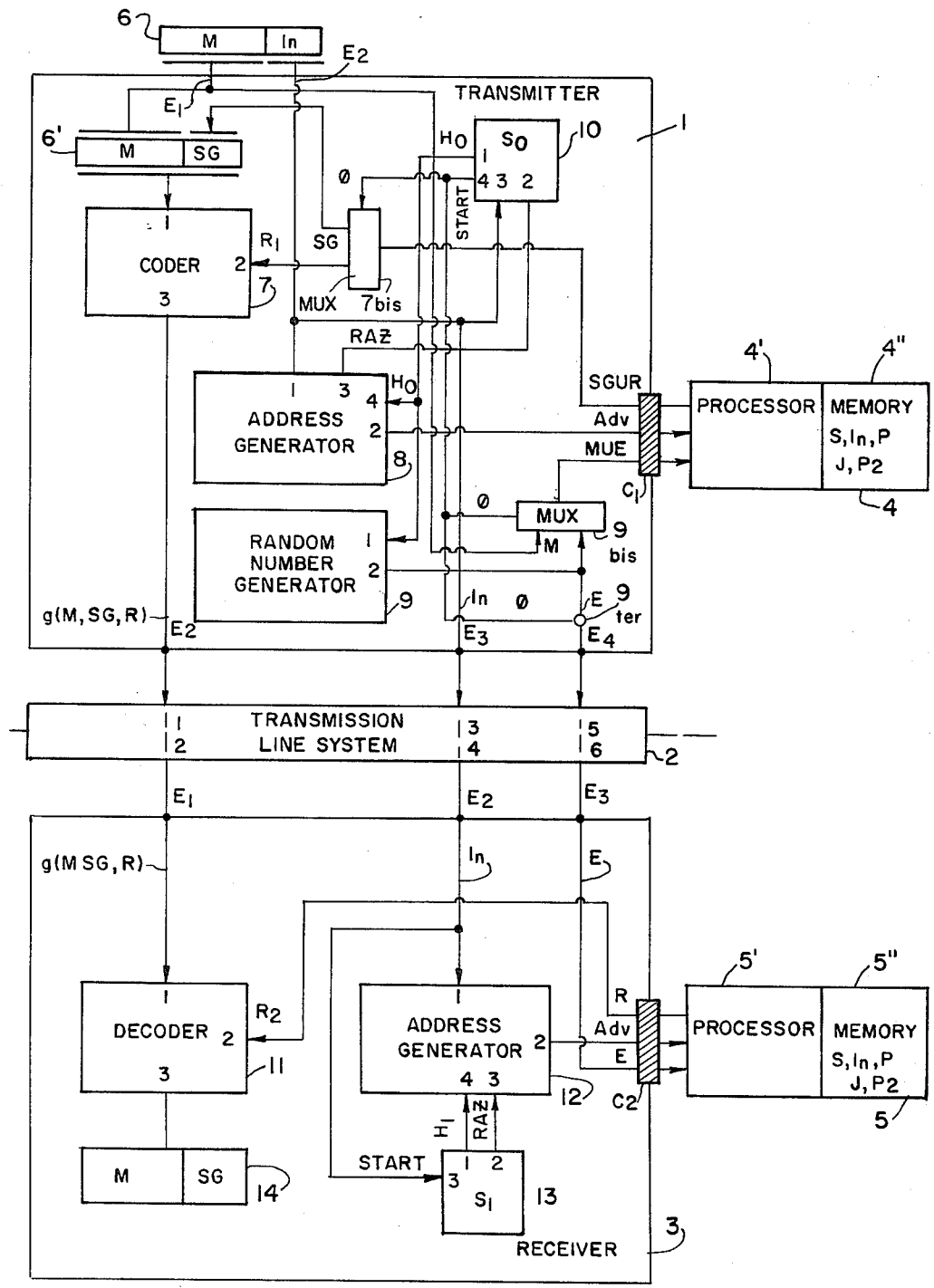
FIG. 1 illustrates the arrangement of one embodiment of a data processing system in accordance with the invention.

The system illustrated in FIG. 1 comprises a transmitter 1 and a receiver 3 interconnected by a transmission line system 2. The transmitter 1 and receiver 3 are adapted to be coupled temporarily to portable objects 4 and 5 comprising, respectively, processing means in the form of microprocessors 4' and 5', as well as memories or storage devices 4'' and 5''. Portable objects of this kind are described in commonly-assigned Ugon U.S. Pat. No. 4,211,919, issued July 8, 1980, and entitled "PORTABLE DATA CARRIER INCLUDING A MICROPROCESSOR", the entire disclosure of which is hereby expressly incorporated by reference.

The storage devices 4'' and 5'' of the portable objects 4 and 5 are divided into at least five sections. The first is a secret section containing a secret code S which is written when the portable object 4 or 5 is initialized. The secret code S may thereafter be read only by the processor 4' or 5' of the portable object 4 or 5 itself, and cannot in any event be read from the outside.

The second section contains the identification codes $I_n$ related to the messages which the bearer of the object is authorized to transmit or receive. The writing of the identification codes $I_n$ in the second memory section may be protected for reasons of security by a key code unknown to the bearer of the portable object.

The third section contains a program $P_1$, the function of which is to calculate an intrinsic key R from the parameters S, $I_n$ and from the common key E. This is summarized as the function $R = P_1(S,I_n,E)$.

The fourth section contains the secret code J related to the legitimate holder of the portable object.

The fifth section contains a program $P_2$, the function of which is to calculate the signature SG from the parameters J, $I_n$ and from the message M which is to be transmitted, as summarized by the function $SG = P_2(J,I_n,M)$. Each message, even from the same signatory, thus has a different signature SG, and identical messages transmitted by different persons thus have different signatures.

The fourth and fifth memory sections are not in use when the portable object is utilized for reception.

Once the programs $P_1$ and $P_2$ have been written, they cannot be altered and may advantageously be contained in a Read Only Memory (ROM). The writing of the identification codes $I_n$ into the second section of the memory may for security reasons be protected by a standard key unknown to the bearer of the portable object.

While in no way intended to limit the scope of the invention, the information stored in the memories 4" and 5" and operated on by the processors 4' and 5' may be similar to that which is disclosed in the above-identified commonly-assigned Herve application Ser. No. 200,785, filed Oct. 27, 1980. Below is repeated a specific example of a suitable program P. This particular example corresponds to the program $P_1$ for calculating an intrinsic key R from S, $I_n$ and E. The program $P_2$ for calculating a signature SG from J, $I_n$ and M.

First, the data words have the following lengths in this specific example: The identification code $I_n$ is 32 bits long; the common key E is also 32 bits long; and the secret code S is 64 bits long. The result of the computation, the intrinsic key R, is 64 bits long.

The computation effected by the instructions comprising the stored program P executed in the microprocessors 4' and 5' has the following three overall steps:

(1) First, an intermediate result, $R_1$, is calculated by concatenating E with $I_n$. $R_1 = (E, I_n)$.

(2) Second, another intermediate result, $S_1$, is calculated by an EXCLUSIVE-OR operation of $R_1$ with S. $S_1 = R_1 \oplus S$.

(3) Third, the result, R, is calculated by multiplying S with $S_1$ with $R_1$, modulo $2^{64}-1$. $R = S \times S_1 \times R_1$, modulo $2^{64}-1$.

This computation can be performed in a microprocessor carried on a card such as is disclosed in the above-referenced Ugon U.S. Pat. No. 4,211,919. By way of example, a suitable commercially-available memory device which may be employed as the memories 4" and 5" is a Mostek Type No. MK4022. Similarly, the microprocessors 4' and 5' may each comprise an Intel Type No. 8080 or an Intel Type No. 8085.

The following lists one form of machine-language program which may be employed as the programs P. This program listing assumes that registers denoted A, B, C, D and T (not shown) are available.

| EXAMPLE PROGRAM LISTING | |
|---|---|
| Instructions | Comments |
| 001 Load $I_n \rightarrow A$ | Load registers A, B and C with the parameters $I_n$, E, S |
| 002 Load $E \rightarrow B$ | |
| 003 Load $S \rightarrow C$ | |

| EXAMPLE PROGRAM LISTING | |
|---|---|
| Instructions | Comments |
| 004 MOV B $\rightarrow$ A | Concatenate E with $I_n$ to generate $R_1$, and leave in register A |
| 005 MOV A, T | Also store $R_1$ in register T |
| 006 X CT | $S_1 = R_1 \oplus S$, to T |
| 007 MUL (T C) | $S \times S_1$ to T |
| 008 MUL (T A) | $R = S \times S_1 \times R_1$ to T |
| 009 Load $2^{64} - 1 \rightarrow D$ | Load value $2^{64} - 1$ into register D |
| 010 COMP (T, D) | if $R \geq 2^{64} - 1$ |
| 011 IF (1) | return to 1 |
| 012 END | |

The particular transmission line system 2 employed is not important insofar as the present invention is concerned, and may be selected as desired from among available forms of transmission line systems such as those using an electric cable, or an optical, acoustic, magnetic, electromagnetic, or radio wave connection.

The FIG. 1 transmitter 1 principally comprises a register 6' for concatenation of the message M which is to be transmitted with its signature SG, a coding device 7, a first address generator 8, a random number generator 9, and a sequencer $S_0$ 10. The function of the transmitter 1 is to transmit the message M accompanied by its identification code $I_n$ present in a message-in-clear register 6.

Figure 2:
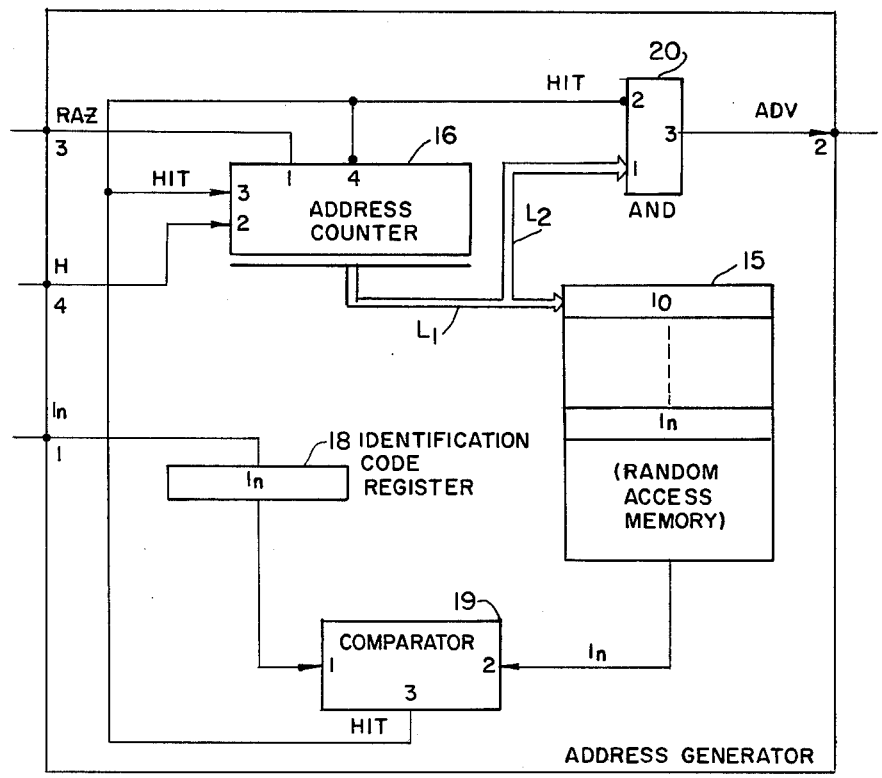
FIG. 2 is an illustration of one of the address generators of FIG. 1.

The FIG. 2 receiver comprises a decoding device 11, second address generator 12 and, a sequencer $S_1$ 13.

The address generators 8 and 12 are described in detail hereinbelow with reference to FIG. 2. The sequencers $S_0$ 10 and $S_1$ 13 are described in detail hereinbelow with reference to FIG. 3.

The portable objects 4 and 5 are adapted to be coupled temporarily to the transmitter 1 and to the receiver 3 by respective coupling means $C_1$ and $C_2$.

The register 6' is connected to the register 6 in a manner such that the contents comprising the message M are transferred from the register 6 into the register 6'.

The coding device 7 receives, at its input terminal 1, the message M in clear associated with its signature SG from the register 6', which message M and signature SG are to be coded. The coding device 7 receives at its input terminal 2 the intrinsic coding key $R_1$ via a multiplexer 7'. An encoded message $g(M,SG,R_1)$ is generated by the coder 7 and transmitted from the coder 7 output terminal 3 to the input terminal 1 of the decoding device 11 via the transmission line system 2. The encoded message $g(M,SG,R_1)$ is then decoded by the device 11 which receives at its input terminal 2 the necessary matching intrinsic key $R_2$. The message M accompanied by its signature SG appears in clear at the decoder 11 output terminal 3 and is depicted at 14. (The coding device 7, the decoding device 11, and the form of encoded message $g(M,SG,R)$ are described in detail hereinbelow with reference to FIG. 4.)

The intrinsic coding key $R_1$ is calculated and supplied by the processor 4' of the portable object 4. Similarly, the intrinsic decoding key $R_2$ is calculated and supplied by the processor 5' of the portable object 5.

The first address generator 8 calculates the address (Adv) of the identification code $I_n$ of the message situated in the memory 4" of the portable object 4 from the identification code $I_n$ linked to the message in clear 6 and transmits this addres via its output 2 to the data and address bus of the portable object 4 (see commmonlyassigned Ugon U.S. Pat. No. 4,211,919), via the coupling means $C_1$. The first address generator 8 is reset to an initial state by the signal RAZ transmitted to its input 3 from the output 2 of the sequencer $S_0$ 10, and is activated by clock signals $H_0$ transmitted to its input 4 from the output 1 of the sequencer $S_0$ 10. The sequencer $S_0$ 10 is energized by a START signal as soon as a message is transmitted to the input $E_2$ (identification code $I_n$ in the register 6) of the transmitter 1.

The system performs constant modification of the intrinsic keys R calculated in the processors 4' and 5' associated respectively with the transmitter 1 and receiver 3 by random alteration of the common key E as a function of time. Specifically, the common key E is generated by a random number generator 9 which may comprise a simple ring counter. The generator 9 supplies a random number forming the common key E in bit serial form as clock signals $H_0$ transmitted by the sequencer $S_0$ 10 are input to the random number generator 9. This random number comprising the common key E is transmitted via the output terminal 2 of the generator 9 to the corresponding input terminals of a multiplexer 9' and of the portable object 5 via an AND gate 9''. At its second input terminal, the multiplexer 9' receives the message M which is to be transmitted coming from the register 6. (In a modified embodiment of the invention, it will be possible to contemplate field reductions of the message M before applying the same to the input side of the multiplexer 9' in such manner as to change it to a format utilizable by the portable object 4.)

In the same way as for the first address generator 8 in the transmitter 1, the second address generator 12 in the receiver 3 is supplied at its input 1 with the identification code $I_n$ (transmitted to it from the register 6 via the transmission line system 2) so that it may calculate and deliver at its output 2 the address of the corresponding identification code $I_n$ in the memory 5'' of the portable object 5. This address generator 12 is reset to an initial state by the signal RAZ applied to its input 3 by the sequencer $S_1$ 13, and is activated by a clock signal $H_1$ fed to its input 4 by the sequencer $S_1$ 13. The sequencer $S_1$ 13 is energized via its input 3 as soon as a message is transmitted via the transmission line 2.

With reference now to FIG. 2, there is shown one embodiment of an address generator suitable for use as the address generators 8 and 12 of FIG. 1. The FIG. 2 address generator comprises a memory 15 which may for example be either a Random Access Memory (RAM), a Programmable Read Only Memory (PROM), or an Erasable Programmable Read Only Memory (EPROM). This memory 15 contains a table of all identification codes $I_0$ through $I_n$ of the messages which the system is authorized to transmit.

The memory 15 is addressed by means of an address counter 16. This address counter 16 is stepped by means of the clock signal H applied at the input 4 of the address generator, and is reset to zero by the signal RAZ applied at the input 3 of the address generator.

The address counter 16 determines the address of the identification code $I_n$ contained in the memory 4'' or 5'' of the portable object 4 or 5 and corresponding to the message 6 which is to be transmitted. This determination is performed by an identification code register 18 and a comparator 19. The identification code $I_n$ accompanying the message 6 which is to be transmitted is fed into the identification register 18, after which the address counter 16 progresses at the rate of the clock H so as to address and read the identification codes $I_n$ contained in the memory 15. The identification codes $I_n$ are thus presented successively at an input of the comparator 19 which compares them to the identification code contained in the identification code register 18.

If correspondence is established by the comparison, progression of the address counter 16 is stopped by application of the signal HIT to address counter 16 input 4, the signal HIT being supplied by output 3 of the comparator 19. At the same time, the contents of the address counter 16 (representing the address of the location within the portable object 4 or 5 of the identification code $I_n$ of the message which is to be transmitted) is transmitted via an AND gate 20 (activated at its input 1 by the signal HIT) as a signal ADV to the output 2 of the address generator.

Figure 3:
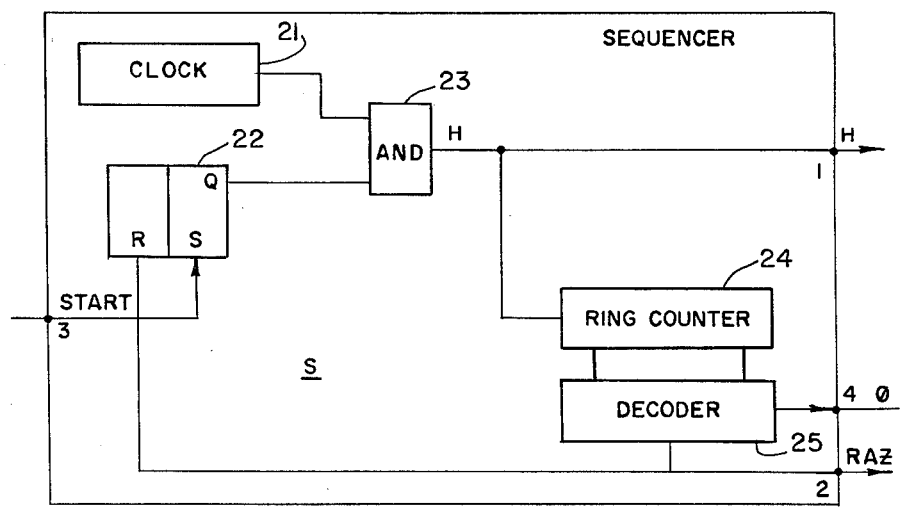
FIG. 3 is an illustration of one of the sequencers of FIG. 1.

Similarly, with reference now to FIG. 3, an embodiment of a sequencer suitable for use as the sequencers $S_0$ 10 and $S_1$ 13 of FIG. 1 is shown. The FIG. 3 sequencer comprises a clock 21, an RS flip-flop 22, an AND gate 23, a ring counter 24, and a decoder 25. An input of the AND gate 23 receives the clock signals coming from the clock 21, these signals being retransmitted at the AND gate 23 output towards the output 1 of the sequencer when the other input of the gate 23 is activated via the Q output of the flip-flop 22. The Q output of the flip-flop 22 assumes a logic high state (binary "1") when it is triggered at its Set input (S) by the START signal applied to the input 3 of the sequencer. This START signal may comprise a particular bit of the identification code $I_n$ accompanying the message 6 which is to be transmitted. The signal H is transmitted to the input of the ring counter 24 of which a particular state is decoded by the decoder 25 to actuate the multiplexers 7' and 9', and the AND gate 9'' of the transmitter 9. Another state of the ring counter 24 is decoded by the decoder 25 in such manner as to reset the flip-flop 22 to the zero state and deliver the zero reset signal RAZ at the output terminal 2 of the sequencer.

Figure 4:
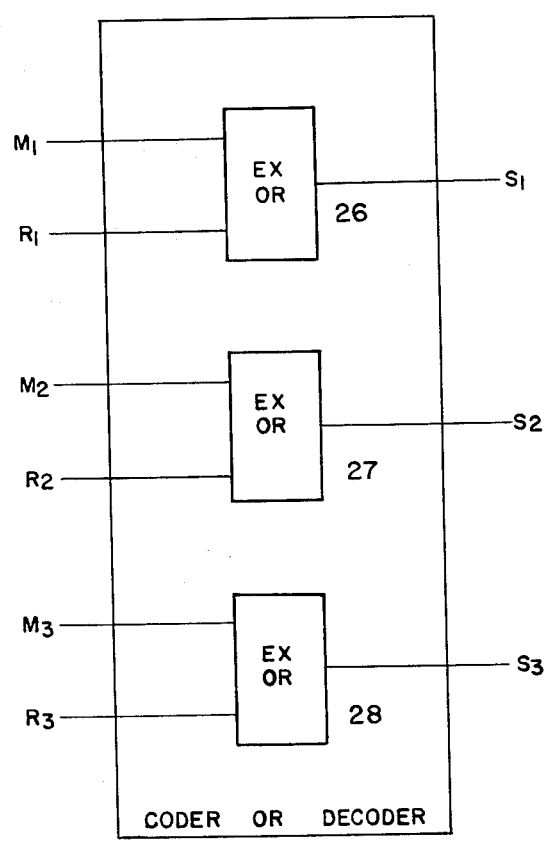
FIG. 4 illustrates an exemplary combinatory circuit utilized in the coding and decoding operations.

With reference now to FIG. 4, there is shown a combinatory circuit such as may comprise both the FIG. 1 coding device 7 and the FIG. 1 decoding device 11. As shown, the FIG. 4 circuit comprises EXCLUSIVE-OR logic gates. In operation, upon transmission, a bit $M_i$ of the message to be transmitted (or $SG_i$ of the signature) and a bit $R_i$ of the intrinsic key are applied, respectively, to an input of an EXCLUSIVE-OR circuit in such manner that the resulting combination satisfies the Boolean logic equation $S_i = M_i \oplus R_i$ (or $S_i = SG_i \oplus R_i$ in the case of the signature). Upon reception, decoding is performed by also employing an EXCLUSIVE-OR circuit. The signals $S_i$ and $R_i$ are applied to two of its inputs in such manner as to restore the bits $M_i$. The equation for the restored $M_i$ is $M_i = S_i \oplus R_i$.

The example of FIG. 4 shows an embodiment of a coding circuit for a message M and an intrinsic key word R each of three bits. The EXCLUSIVE-OR gates 26, 27 and 28 deliver the signals $S_1$ to $S_3$ as follows:

$S_1 = M_1 \oplus R_1$ $S_2 = M_2 \oplus R_2$ $S_3 = M_3 \oplus R_3$

Similarly, for decoding, EXCLUSIVE-OR gates deliver the signals $M_1$ to $M_3$ of the restored message M as follows:

$$M_1 = S_1 \oplus R_1$$

$$M_2 = S_2 \oplus R_2$$

$$M_3 = S_3 \oplus R_3$$

The restored message is thus identical to the original message, regardless of the specific message and the specific intrinsic key R, so long as identical intrinsic keys $R_1$ and $R_2$ are used for both coding and decoding.

In summary, the operation of the system for transmission of signed messages in accordance with the invention is as follows:

The appearance of the message in clear at the input terminals $E_1$ and $E_2$ of the transmitter 1 causes the triggering of the respective address generators 8 and 12 of the transmitter 1 and the receiver 3, as well as of the random number or common key E generator 9. The identity of the message is recognized by the respective address generators 8 and 12 which then transmit to the portable objects 4 and 5 the address (Adv) of the corresponding identity code $I_n$ in the memories 4″ and 5″ of the portable objects 4 and 5.

The multiplexer 9′ transmits the message M to the processor 4′ of the portable object 4. The signature SG is then calculated by the processor of the portable object 4 according to the function $SG = P_2(J, I_n, M)$. The resultant signature SG is then transmitted via the multiplexer 7′ into the register 6′ in which the message M which is to be transmitted and the signature SG are concatenated.

Upon appearance of the signal delivered by the sequencer SO 10, the random code number comprising the common key E is transmitted in its turn to the portable object 4 and to the receiver 3. The intrinsic keys $R_1$ and $R_2$ are then calculated by the processing devices of each of the portable objects by means of the function $R_x = P_1(S, I_n, E)$, one example of which is given hereinabove. If the portable objects are of the same nature, that is to say if they each contain the same program $P_1$, the same secret code S and the same identification code $I_n$, the calculated intrinsic keys $R_1$ and $R_2$ are then the same. The intrinsic key $R_1$ is applied to the coding device 7, and the intrinsic key $R_2$ is applied to the decoding device 11. The message received at 14 is then identical to the message in clear M transmitted at 6, and it complementarily comprises its signature.

The example which has been given of a preferred embodiment of the invention is not restrictive in any way, and it will be possible to envisage modified embodiments of the invention without thereby exceeding its scope. As a matter of fact, in accordance with the same principle, it will be optional to embody a system permitting the transmission of cosigned messages. This will be the case where the message will imply a mutual engagement, the sender and the addressee wishing to be in possession of the text bearing the signature of the other party. To this end, the sender will ask the addressee to retransmit under his own signature, the message blocks he receives, as and when received.

Similarly, it will always be possible to issue to the sender a message certifying receipt of signed information, the addressee having to collate the signature or signatures appended to the data received in a reply message, and to append his own signature to the same. This message will be an acknowledgement of receipt which is conclusive, since only the sender can produce the signatures associated with the message transmitted and only the addressee can sign the acknowledgement of receipt.

What is claimed is:

1. A process for the transmission of signed messages M between a transmitter and a receiver connected via a transmission line system, the transmitter including a coding device and the receiver including a decoding device, said process comprising:

calculating a signature SG at the transmitter location as a function of the message M which is to be transmitted and as a function of a secret code J which enables the subsequent certification of the signature;

linking the message with the signature thus obtained;

generating at the transmitter location a common key E;

calculating at the transmitter location as a function of at least the common key E an intrinsic coding key $R_1$ and employing the intrinsic coding key $R_1$ to encode the linked message and signature;

causing the transmitter to transmit the common key E and the encoded message and signature; and calculating at the receiver location as a function of at least the common key E an intrinsic decoding key $R_2$ and employing the intrinsic decoding key $R_2$ to decode the coded message and signature.

2. A process for the transmission of signed messages according to claim 1, wherein the intrinsic coding and decoding keys calculated at the transmitter and receiver locations are the same.

3. A process for the transmission of signed messages according to claim 1, wherein each intrinsic coding key is calculated also as a function of a secret code S which must match at the transmitter and receiver locations, and wherein the secret code S differs from the secret code J.

4. A process for the transmission of signed messages according to claim 2, wherein each intrinsic key is calculated also as a function of a secret code S which must match at the transmitter and receiver locations, and wherein the secret code S differs from the secret code J.

5. A process for the transmission of signed messages according to claim 1, wherein the common key E transmitted by the transmitter to the receiver is a random number.

6. A process for the transmission of signed messages according to claim 2, wherein the common key E transmitted by the transmitter to the receiver is a random number.

7. A process for the transmission of signed messages according to claim 3, wherein the common key E transmitted by the transmitter to the receiver is a random number.

8. A process for the transmission of signed messages according to claim 4, wherein the common key E transmitted by the transmitter to the receiver is a random number.

9. A process for the transmission of signed messages according to claim 1, wherein the signature is calculated also as a function of an identification code $I_n$ linked to the message M to be transmitted, and which further comprises causing the transmitter to transmit the identification code $I_n$.

10. A process for the transmission of signed messages according to claim 2, wherein the signature is calculated also as a function of an identification code $I_n$ linked to the message M to be transmitted, and which further comprises causing the transmitter to transmit the identification code $I_n$.

11. A process for the transmission of signed messages according to claim 3, wherein the signature is calculated also as a function of an identification code $I_n$ linked to the message M to be transmitted, and which further comprises causing the transmitter to transmit the identification code $I_n$.

12. A process for the transmission of signed messages according to claim 4, wherein the signature is calculated also as a function of an identification code $I_n$ linked to the message M to be transmitted, and which further comprises causing the transmitter to transmit the identification code $I_n$.

13. A process for the transmission of signed messages according to claim 5, wherein the signature is calculated also as a function of an identification code $I_n$ linked to the message M to be transmitted, and which further comprises causing the transmitter to transmit the identification code $I_n$.

14. A process for the transmission of signed messages according to claim 6, wherein the signature is calculated also as a function of an identification code $I_n$ linked to the message M to be transmitted, and which further comprises causing the transmitter to transmit the identification code $I_n$.

15. A process for the transmission of signed messages according to claim 7, wherein the signature is calculated also as a function of an identification code $I_n$ linked to the message M to be transmitted, and which further comprises causing the transmitter to transmit the identification code $I_n$.

16. A process for the transmission of signed messages according to claim 8, wherein the signature is calculated also as a function of an identification code $I_n$ linked to the message M to be transmitted, and which further comprises causing the transmitter to transmit the identification code $I_n$.

17. A process for the transmission of signed messages according to claim 1, wherein the the message and signature are linked by concatenation.

18. A process for the transmission of signed messages according to claim 2, wherein the the message and signature are linked by concatenation.

19. A process for the transmission of signed messages according to claim 3, wherein the the message and signature are linked by concatenation.

20. A process for the transmission of signed messages according to claim 4, wherein the the message and signature are linked by concatenation.

21. A process for the transmission of signed messages according to claim 5, wherein the the message and signature are linked by concatenation.

22. A process for the transmission of signed messages according to claim 6, wherein the the message and signature are linked by concatenation.

23. A process for the transmission of signed messages according to claim 7, wherein the the message and signature are linked by concatenation.

24. A process for the transmission of signed messages according to claim 8, wherein the the message and signature are linked by concatenation.

25. A process for the transmission of signed messages according to claim 9, wherein the the message and signature are linked by concatenation.

26. A process for the transmission of signed messages according to claim 10, wherein the the message and signature are linked by concatenation.

27. A process for the transmission of signed messages according to claim 11, wherein the the message and signature are linked by concatenation.

28. A process for the transmission of signed messages according to claim 12, wherein the the message and signature are linked by concatenation.

29. A process for the transmission of signed messages according to claim 13, wherein the the message and signature are linked by concatenation.

30. A process for the transmission of signed messages according to claim 14, wherein the the message and signature are linked by concatenation.

31. A process for the transmission of signed messages according to claim 15, wherein the the message and signature are linked by concatenation.

32. A process for the transmission of signed messages according to claim 16, wherein the the message and signature are linked by concatenation.

33. A system for the transmission of signed messages M between a transmitter and a receiver interconnected by a transmission line system, the transmitter and receiver respectively including a coder and a decoder for coding and decoding each message M and its signature, said system comprising:
  means located at the transmitter for calculating a signature SG as a function of the message M which is to be transmitted and as a function of a secret code J which enables the subsequent certification of the signature;
  means located at the transmitter for linking the message M which is to be transmitted with the calculated signature;
  means located at the transmitter for generating a common key E;
  means located at the transmitter for calculating an intrinsic coding key $R_1$ as a function of at least the common key E for use by the coder to encode the linked message M and signature SG;
  means in the transmitter for transmitting the common key E and the encoded message and signature to the receiver; and
  means located at the receiver for calculating an intrinsic decoding key $R_2$ as a function of at least the common key E for use by the decoder to decode the encoded message M linked with its signature SG.

34. A system for the transmission of signed messages between a transmitter and a receiver according to claim 33, wherein said means for calculating an intrinsic coding key $R_1$ and said means for calculating an intrinsic decoding key $R_2$ each comprise a portable electronic object including;
  a storage device containing a secret code S which must match at the transmitter and receiver and a program $P_1$;
  coupling means for connecting each of said portable objects to the respective one of the transmitter and receiver for transmitting the common key E from the respective one of the transmitter or receiver to said portable object and for transmitting the respective intrinsic key $R_1$ or $R_2$ from the portable object to the respective one of the transmitter and receiver; and
  processing means situated between the coupling means and the said storage device for calculating the respective intrinsic key $R_1$ or $R_2$ by execution of the program $P_1$ as a function of the values of the secret code S and of the common key E.

35. A system for the transmission of signed messages between a transmitter and a receiver according to claim 33, wherein said means in the transmitter for generating a common key E comprises a random number generator.

36. A system for the transmission of signed messages between a transmitter and a receiver according to claim 34, wherein said means in the transmitter for generating a common key E comprises a random number generator.

37. A system for the transmission of signed messages between a transmitter and a receiver according to claim 33, wherein said means for calculating a signature SG comprises a portable electronic object including:
  a storage device containing the secret code J which enables the subsequent certification of the signature and a program $P_2$;
  coupling means for connecting said portable object to the transmitter for transmitting the message M from said transmitter to said portable object and for transmitting the signature SG from the portable object to the transmitter; and
  processing means situated between said coupling means and said storage device for calculating the signature SG as a function of the program $P_2$, of the secret code J, and of the message M.

38. A system for the transmission of signed messages between a transmitter and a receiver according to claim 34, wherein said means for calculating a signature SG also comprises said portable electronic object, and wherein:
  said storage device also contains the secret code J which enables the subsequent certification of the signature, the secret code J differing from the secret code S, and a program $P_2$;
  said coupling means for connecting said portable object to the transmitter is also for transmitting the message M from said transmitter to said portable object and for transmitting the signature SG from the portable object to the transmitter; and
  said processing means situated between said coupling means and said storage device is also for calculating the signature SG as a function of the program $P_2$, of the secret code J, and of the message M.

39. A system for the transmission of signed messages between a transmitter and a receiver according to claim 35, wherein said means for calculating a signature SG comprises a portable electronic object including:
  a storage device containing the secret code J which enables the subsequent certification of the signature and a program $P_2$;
  coupling means for connecting said portable object to the transmitter for transmitting the message M from said transmitter to said portable object and for transmitting the signature SG from the portable object to the transmitter; and
  processing means situated between said coupling means and said storage device for calculating the signature SG as a function of the program $P_2$, of the secret code J, and of the message M.

40. A system for the transmission of signed messages between a transmitter and a receiver according to claim 36, wherein said means for calculating a signature SG also comprises said portable electronic object, and wherein:
  said storage device also contains the secret code J which enables the subsequent certification of the signature, the secret code J differing from the secret code S, and a program $P_2$;
  said coupling means for connecting said portable object to the transmitter is also for transmitting the message M from said transmitter to said portable object and for transmitting the signature SG from the portable object to the transmitter; and
  said processing means situated between said coupling means and said storage device is also for calculating the signature SG as a function of the program $P_2$, of the secret code J, and of the message M.

41. A system for the transmission of signed messages between a transmitter and a receiver according to claim 33, wherein said means for linking the message which is to be transmitted with the calculated signature comprises a register for concatenating the message M and the signature.

42. A system for the transmission of signed messages between a transmitter and a receiver according to claim 37, wherein said means for linking the message which is to be transmitted with the calculated signature comprises a register for concatenating the message M and the signature.

43. A system for the transmission of signed messages between a transmitter and a receiver according to claim 38, wherein said means for linking the message which is to be transmitted with the calculated signature comprises a register for concatenating the message M and the signature.

44. A system for the transmission of signed messages between a transmitter and a receiver according to claim 37, wherein the secret codes J and S are inaccessible to agencies external to the system.

45. A system for the transmission of signed messages in accordance with claim 34, wherein:
  said storage device included in said portable electronic object also contains a table of message identification codes $I_n$ corresponding to messages which are authorized to be transmitted or received, these identification codes being stored as table entries at predetermined addresses; wherein
  said transmitter includes an address generator for determining from an identification code $I_n$ linked to the message M the address within said storage device at which the corresponding identification code $I_n$ is stored; wherein
  said coupling means also transmits the address to the portable object; and wherein
  said processing means calculates the intrinsic key as a function also of the identification code $I_n$ read from the storage device at the transmitted address.

46. A system for the transmission of signed messages in accordance with claim 37, wherein:
  said storage device included in said portable electronic object also contains a table of message identification codes $I_n$ corresponding to messages which are authorized to be transmitted or received, these identification codes being stored as table entries at predetermined addresses; wherein
  said transmitter includes an address generator for determining from an indentification code $I_n$ linked to the message M the address within said storage device at which the corresponding identification code $I_n$ is stored; wherein
  said coupling means also transmits the address to the portable object; and wherein said processing means calculates the signature SG as a function also of the identification code $I_n$ read from the storage device at the transmitted address.

47. A system for the transmission of signed messages in accordance with claim 38, wherein:

said storage device included in said portable electronic object also contains a table of message identification codes $I_n$ corresponding to messages which are authorized to be transmitted or received, these identification codes being stored as table entries at predetermined addresses; wherein said transmitter includes an address generator for determining from an indentification code $I_n$ linked to the message M the address within said storage device at which the corresponding identification code $I_n$ is stored; wherein said coupling means also transmit the address to the portable object; and wherein said processing means calculates the intrinsic key as a function also of the identification code $I_n$ read from the storage device at the transmitted address and calculates the signature SG as a function also of the identification code $I_n$ read from the storage device at the transmitted address.

48. A system for the transmission of signed messages in accordance with claim 39, wherein:

said storage device included in said portable electronic object also contains a table of message identification codes $I_n$ corresponding to messages which are authorized to be transmitted or received, these identification codes being stored as table entries at predetermined addresses; wherein said transmitter includes an address generator for determining from an identification code $I_n$ linked to the message M the address within said storage device at which the corresponding identification code $I_n$ is stored; wherein said coupling means also transmits the address to the portable object; and wherein said processing means calculates the signature SG as a function also of the identification code $I_n$ read from the storage device at the transmitted address.

49. A system for the transmission of signed messages in accordance with claim 40, wherein;

said storage device included in said portable electronic object also contains a table of message identification codes $I_n$ corresponding to messages which are authorized to be transmitted or received, these identification codes being stored as table entries at predetermined addresses; wherein said transmitter includes an address generator for determining from an identification code $I_n$ linked to the message M the address within said storage device at which the corresponding identification code $I_n$ is stored; wherein said coupling means also transmits the address to the portable object; and wherein said processing means calculates the intrinsic key as a function also of the identification code $I_n$ read from the storage device at the transmitted address and calculates the signature SG as a function also of the identification code $I_n$ read from the storage device at the transmitted address.

* * * * *